United States Patent [19]

Hanlon et al.

[11] Patent Number: 4,609,475

[45] Date of Patent: Sep. 2, 1986

[54] METHOD OF IMPROVING THE PERMEABILITY OF A SUBTERRANEAN FORMATION BY REMOVAL OF POLYMERIC MATERIALS THEREFROM

[75] Inventors: David J. Hanlon; J. Michael Wilson; Jimmie D. Weaver, all of Duncan, Okla.

[73] Assignee: Halliburton Company, Duncan, Okla.

[21] Appl. No.: 582,994

[22] Filed: Feb. 24, 1984

[51] Int. Cl.$^4$ .................... E21B 43/25; E21B 43/28
[52] U.S. Cl. ..................... 252/8.55 B; 252/186.43; 166/307; 166/311; 166/312; 252/8.553; 252/8.551
[58] Field of Search ............ 166/305 R, 307, 311–312; 252/8.55 B, 8.55 C, 186.43, 8.55 R; 423/272, 273

[56] References Cited

U.S. PATENT DOCUMENTS

| | | | |
|---|---|---|---|
| 2,198,435 | 4/1940 | Hart | 166/21 |
| 2,217,676 | 10/1940 | Fry | 166/21 |
| 2,221,353 | 11/1940 | Limerick et al. | 252/8.55 B |
| 2,910,436 | 10/1959 | Fatt et al. | 252/8.55 |
| 2,978,026 | 4/1961 | Bemis | 166/44 |
| 3,367,417 | 2/1968 | McCabe | 166/4 |
| 3,482,635 | 12/1969 | Pasini, III | 166/305 |
| 3,482,636 | 12/1969 | Crowe | 166/307 |
| 3,528,503 | 9/1970 | Crowe | 166/300 |
| 3,529,666 | 9/1970 | Crowe | 166/300 |
| 3,794,523 | 2/1974 | Thompson | 134/3 |
| 3,819,520 | 6/1974 | Jones et al. | 166/307 X |
| 3,858,657 | 1/1975 | Haws | 166/305 R |
| 4,234,433 | 11/1980 | Rhudy et al. | 252/8.55 D |
| 4,320,102 | 3/1982 | Dalton, Jr. et al. | 423/273 |
| 4,464,268 | 8/1984 | Schievelbein | 252/8.55 B |

OTHER PUBLICATIONS

SPE 10624 Stimulation of Water Injection Wells in the Los Angeles Basin Using Sodium Hypochloride and Mineral Acids, David M. Clementz.

New Treating Technique to Remove Bacterial Residues From Water-Injection Wells, C. W. Crowe, pp. 475–478, Journal of Petroleum Technology, May 1968.

*Primary Examiner*—Joseph L. Schofer
*Assistant Examiner*—F. M. Teskin
*Attorney, Agent, or Firm*—Edward F. Sherer

[57] ABSTRACT

A composition for and method of removing polymeric material from a porous media such as a subterranean formation. The method comprises contacting the polymeric material with an aqueous composition having a pH of from about 2 to about 10 and comprising an oxidizing agent, a water soluble carboxylic acid, and optionally, a source which is effective in promoting the decomposition of the oxidizing agent.

10 Claims, No Drawings

METHOD OF IMPROVING THE PERMEABILITY OF A SUBTERRANEAN FORMATION BY REMOVAL OF POLYMERIC MATERIALS THEREFROM

BACKGROUND OF THE INVENTION

A. Field of the Invention

This invention relates to a composition for and a method of treating a porous media such as a subterranean formation wherein polymeric materials such as polyacrylamide, polyacrylic acid, and polysaccharides such as xanthan gum are removed from the porous media.

B. Description of the Prior Art

Aqueous solutions of polymers are commonly used in the recovery of hydrocarbons from a subterranean formation. For instance, in carrying out fracturing, acidizing, and polymerflooding operations, polymers, such as polyacrylamide, polyacrylic acid, and polysaccharides such as xanthan gum are commonly utilized. In addition, polymeric solutions are used to simulate field conditions on laboratory cores. It is often desirable to remove the polymer from the formation or laboratory core to increase the permeability thereof.

The term "permeability," as used herein, includes absolute or specific permeability and refers to a system where all three conditions for D'Arcy's Law are met and is usually defined as the permeability to one phase in a single phase system. This is the basic total rock permeability and is independent of the fluid present provided there is no reaction, physical or chemical, between the rock and the fluid which would alter the properties of either.

Various methods have been proposed for removing polymeric materials from a porous formation. For instance, U.S. Pat. No. 3,482,636 discloses a method of improving the permeability of a porous formation by injecting into the formation a composition comprising a hypohalite selected from the class consisting of water-soluble hypochlorites and hypobromites and an alkali metal hydroxide inhibitor sufficient to give an alkaline pH value of at least about 13.

U.S. Pat. No. 3,482,635 discloses the removal of polyacrylamide from a porous formation comprising contacting the formation with a basic aqueous solution consisting of mono and divalent metal salts.

U.S. Pat. No. 3,528,503 discloses the removal of organic materials from a geologic formation by injecting into the formation an aqueous solution of permanganic acid or a water soluble salt thereof followed by the injection of an aqueous solution of an acid having a ionization constant of at least $1 \times 10^{-5}$.

U.S. Pat. No. 3,529,666 discloses the removal of organic materials from a geologic formation comprising injecting in sequence an aqueous solution of hydrogen peroxide, an alkali metal peroxide or mixtures thereof followed by the injection of an aqueous solution of an acid having an ionization constant of least $1 \times 10^{-5}$.

U.S. Pat. No. 3,858,657 discloses the removal of polyacrylamide and its derivatives from a subterranean formation by contacting the formation with an aqueous polyamine solution.

The present invention provides a composition for and a method of solubilizing polymeric materials in a porous media in a one-stage treatment utilizing an aqueous composition which results in an increase in the permeability of the porous media.

SUMMARY OF THE INVENTION

The present invention is a composition for and a method of improving the permeability of a porous media such as a subterranean formation wherein polymeric material is lodged in the pores of the media comprising contacting the polymeric material with an aqueous composition having a pH of from about 2 to about 10 and comprising an oxidizing agent, a water soluble carboxylic acid, and optionally, a source which is effective in promoting the decomposition of the oxidizing agent. Thereafter, the residual aqueous composition is preferably flushed from the formation by means of water, brine, or other flushing fluids.

The composition and method of the present invention has been found to be particularly effective in loosening and removing polymeric materials such as polyacrylamide, polyacrylic acid, and polysaccharides such as xanthan gum from a subterranean formation.

DESCRIPTION OF THE PREFERRED EMBODIMENTS

Water soluble carboxylic acids which are suitable for use in the present invention include formic acid, acetic acid, propionic acid, butyric acid, lactic acid, glycolic acid, citric acid, and mixtures thereof.

The preferred carboxylic acids are acetic acid and citric acid. These acids exhibit a great effect in removing polymeric material from the porous media yet are relatively non-corrosive with respect to the metal parts upon which the acids may come into contact. The most preferred carboxylic acid for use is citric acid.

Oxidizing agents which can be used in the present invention include sodium perborate, hydrogen peroxide, alkali metal peroxides such as sodium peroxide and potassium peroxide, sodium percarbonate which is also known as sodium carbonate peroxydihydrate, sodium or potassium peroxydiphosphate, potassium percarbonate which is also known as potassium carbonate peroxydihydrate, and mixtures thereof.

Due to ease of handling and availability, the preferred oxidizing agent is sodium perborate.

The amount of oxidizing agent and carboxylic acid used in the practice of the invention will vary over a wide range depending upon the formation to be treated. Therefore, there are no limitations in this regard. Generally, however, the amount of oxidizing agent or carboxylic acid employed in the practice of the invention is between about 0.1 and 50.0 percent by weight of the aqueous composition. The preferred limits to employ are between about 2.0 and 20.0 percent by weight of the aqueous composition employed.

Optionally, a source which is effective in promoting the decomposition of the oxidizing agent can be added to the aqueous composition comprising the oxidizing agent and water soluble carboxylic acid. The source increases the rate by which the aqueous composition solubilizes the polymeric materials in the porous media.

The precise manner that the source functions to increase the rate by which the aqueous composition solubilizes the polymeric materials is not fully understood and need not be. Although the invention is not intended to be limited to any particular theory of operation, it is believed that the addition of the source, which is effective in promoting the decomposition of the oxidizing agent, to the aqueous composition comprising the carboxylic acid and the oxidizing agent increases the rate of formation of free radicals from the oxidizing agent. It is believed that the free radicals attack the polymeric material and cause the polymeric material to be broken into smaller polymeric units. Regardless of the theory proposed, it is sufficient to point out that the sources operate successfully in the manner disclosed herein.

Any source which promotes the decomposition of the oxidizing agent can be used to carry out the invention. Examples of suitable sources which promote the decomposition of the oxidizing agent include water soluble alkyl alcohols such as methyl alcohol, ethyl alcohol, propyl alcohol, n-butyl alcohol, isopropyl alcohol, and isoamyl alcohol, water soluble substituted alcohols such as ethylene glycol and diacetone alcohol and metal ions such as cuprous ions, ferrous ions, cobalt ions, and mixtures thereof. The source of cuprous ions can comprise, for example, cuprous chloride. The source of ferrous ions can comprise, for example, ferrous chloride, ferrous sulfate, and mixtures thereof. The source of cobalt ions can comprise, for example, cobalt nitrate, cobalt chloride and mixtures thereof. The preferred source is ferrous chloride.

The source for promoting the decomposition of the oxidizing agent can be present in the aqueous composition comprising the oxidizing agent and water soluble carboxylic acid over a wide range with no limitations. Generally, however, when a source is utilized in the aqueous composition, the source will be present in an amount of from about 0.03% to about 1.0% by weight of oxidizing agent, with about 0.1% by weight being the preferred amount.

In the practice of the invention, it is necessary to adjust the pH value of the aqueous composition to a value of from about 2 to about 10. The preferred pH value is about 4. The pH of the aqueous solution can be adjusted using acidic or alkaline materials well known in the art, e.g., sodium hydroxide or hydrochloric acid.

The preferred aqueous composition of the invention has a pH of about 4.0 and comprises acetic acid which is present in an amount of about 5 percent by weight of the composition, an oxidizing agent comprising sodium perborate which is present in an amount of about 4 percent by weight of the composition, and a source which is effective in promoting the decomposition of the oxidizing agent comprising ferrous chloride which is present in the range of about 0.1% by weight of oxidizing agent.

The organic materials with which this invention is particularly useful includes polyacrylamides, polyacrylic acid, copolymers and partially hydrolyzed derivatives thereof, and polysaccharides such as xanthan gum.

In carrying out the method of the present invention in a subterranean formation, the aqueous composition is introduced into the formation and brought into contact with the polymeric material of which removal is desired preferably at a pressure which is not sufficiently great to fracture the formation. The aqueous composition is preferably allowed to remain in the formation for a time sufficient to solubilize a sufficient amount of polymeric material to increase the permeability of the formation. The amount of time that the aqueous composition remains in the formation will vary over a wide range depending upon factors such as formation temperature, polymeric material concentration, etc. It has been found that a 24 hour period is sometimes preferred. Preferably, the residual aqueous composition is flushed from the formation by water, brine or other flushing fluids.

In carrying out the method of the present invention, it is sometimes preferrable to pump into the formation and into contact with the polymeric material, a quantity of the aqueous composition and allow the aqueous composition to remain static in the formation and then pump additional amounts of the aqueous composition into the formation to allow further solubilization of the polymeric material.

The rate of solubilization of the polymeric material can be adjusted to the conditions of the porous media. It has been found that decreasing the pH of the aqueous composition containing the oxidizing agent and carboxylic acid decreases the rate of decomposition of the oxidizing agent. If a source such as ferrous ions is added to the aqueous composition comprising the carboxylic acid and the oxidizing agent, the decomposition rate of the oxidizing agent increases with the increase being greatest between a pH of from about 3 to about 4.

Although the method of the present invention may be used without a corrosion inhibitor, the presence of an acidic corrosion inhibitor is preferred when the pH of the aqueous composition is below 5. The presence of known acidic corrosion inhibitors in no way interferes with the effectiveness of the invention. Corrosion inhibitors such as inorganic arsenic compounds, acetylenic alcohols, thiophenols, heterocyclic nitrogen compounds, substituted thiophenols, rosin amine derivatives, quaternary ammonium compounds and other similar agents may be employed. Many of these inhibitors are disclosed in U.S. Pat. No. 3,404,094 which is assigned to the assignee of the present invention and is hereby incorporated by reference.

It may also be desirable to add a surfactant to the aqueous composition in order to make the composition compatible with liquid hydrocarbons and thus minimize emulsion formation within the formation.

Although the present invention is of great value in oil field operations, it can also be utilized in a laboratory for regenerating sample cores which have been treated with polymeric materials. By using the present invention on laboratory cores, sample cores can be saved for further use.

The same methods as outlined in the field operations can be used to treat the laboratory cores.

The invention is further exemplified by the examples below and are presented to illustrate certain specific embodiments of the invention, but are not intended to be construed so as to be restrictive of the spirit and scope thereof.

EXAMPLES

In accordance with the present invention, polymeric material was contacted with an aqueous composition which comprised an oxidizing agent present in an amount of about 4% by weight of the composition, a water soluble carboxylic acid present in an amount of about 5% by weight of the composition, and optionally other additives such as an acid inhibitor or a source which is effective in promoting the decomposition of the oxidizing agent.

The series of tests were carried out by adding 100 grams of a solution containing the aqueous compositions to 6 oz. jars. The pH of each solution was then measured. Next, 5 grams of poorly soluble polymeric materials was added to each solution. The tests were carried out at a temperature of 100° F. The amount of dissolution of the polymeric material was visually observed and was reported at various time intervals.

The polyacrylamide utilized in the tests had a molecular weight of about 15,000,000. Rodine 213, which was used in Test No. 31, is an acid inhibitor which is commercially available from Amchem Products, Inc.

The results of these tests are reported in Table I.

Although certain preferred embodiments of the invention have been herein described for illustrative purposes, it will be appreciated that various modifications and innovations of the procedures recited may be effected without departure from the basic principles which underlie the invention. Changes of this type are therefore deemed to lie within the spirit and scope of

TABLE I

| Test No. | Polymer | pH | Acid | Oxidizer | Additive | Time Observed (hrs.) | Amount of Polymer Dissolved (Visually Observed) |
|---|---|---|---|---|---|---|---|
| 1 | polyacrylamide | 3.0 | formic | sodium perborate | — | 6 | 90 |
| 2 | polyacrylamide | 3.0 | formic | sodium perborate | — | 24 | 100 |
| 3 | polyacrylamide | 4.3 | acetic | sodium perborate | — | 6 | 80 |
| 4 | polyacrylamide | 4.3 | acetic | sodium perborate | — | 24 | 100 |
| 5 | polyacrylamide | 4.7 | propionic | sodium perborate | — | 6 | 80 |
| 6 | polyacrylamide | 4.7 | propionic | sodium perborate | — | 24 | 100 |
| 7 | polyacrylamide | 3.4 | lactic | sodium perborate | — | 6 | 80 |
| 8 | polyacrylamide | 3.4 | lactic | sodium perborate | — | 24 | 98* |
| 9 | polyacrylamide | 3.2 | glycolic | sodium perborate | — | 6 | 80 |
| 10 | polyacrylamide | 3.2 | glycolic | sodium perborate | — | 24 | 100 |
| 11 | polyacrylamide | 3.9 | citric | sodium perborate | — | 6 | 98* |
| 12 | polyacrylamide | 3.9 | citric | sodium perborate | — | 24 | 100 |
| 13 | polyacrylamide | 2.5 | acetic | hydrogen peroxide | acid inhibitor(A) | 2 | 100** |
| 14 | polyacrylamide | 2.5 | acetic | hydrogen peroxide | — | 6 | 75 |
| 15 | xanthan | 4.3 | acetic | sodium perborate | — | 72 | 98* |
| 16 | polyacrylamide | 1.9 | acetic | sodium monopersulfate | — | — | *** |
| 17 | polyacrylamide | 4.3 | acetic | sodium peroxydiphosphate | — | 72 | 100 |
| 18 | polyacrylamide | 4.8 | acetic | sodium percarbonate | — | 72 | 100 |
| 19 | polyacrylamide | 2.8 | acetic | sodium hypophosphite | — | 72 | 40 |
| 20 | polyacrylamide | 1.9 | citric | hydrogen peroxide | — | 4 | ** |
| 21 | polyacrylamide | 1.7 | citric | hydrogen peroxide | acid inhibitor(A) | — | ** |
| 22 | xanthan | 3.9 | citric | sodium perborate | — | 72 | 75 |
| 23 | polyacrylamide | 2.5 | acetic | hydrogen peroxide | boric acid(B) | 24 | 100 |
| 24 | polyacrylamide | 10.0 | — | sodium perborate | — | 2 | 100 |
| 25 | polyacrylamide | 4.4 | acetic | sodium perborate | — | 24 | 100 |
| 26 | polyacrylamide | 8.0 | — | hydrogen peroxide | — | 8 | 100 |
| 27 | polyacrylamide | 4.4 | acetic | sodium perborate | $FeCl_2$(C) | 6 | 100 |
| 28 | polyacrylamide | 4.4 | acetic | sodium perborate | $FeCl_2$(C) and acid inhibitor(A) | 2 | 100 |
| 29 | polyacrylamide | 4.0 | acetic | sodium perborate | $FeCl_2$(C) | 2 | 100** |
| 30 | polyacrylamide | 10.2 | — | sodium perborate | — | 2 | 100 |
| 31 | polyacrylamide | 4.0 | acetic | sodium perborate | Rodine 213(A) | 24 | 100 |
| 32 | polyacrylamide | 4.0 | acetic | sodium perborate | alkyl-pyridine(D) | 24 | 100 |
| 33 | polyacrylamide | 4.0 | acetic | sodium perborate | triphenylsulfoniumchloride(D) | 5 | 50 |
| 34 | polyacrylamide | 4.0 | acetic | sodium perborate | triphenylsulfoniumchloride(D) | 24 | 100 |
| 35 | polyacrylamide | 2.5 | acetic | sodium perborate | acid inhibitor(A) | 3 | 100 |
| 36 | polyacrylamide | 4.0 | acetic | sodium perborate | methyl(A) alcohol | 5 | 50 |
| 37 | polyacrylamide | 4.0 | acetic | sodium perborate | thiourea(D) | 18 | 0 |
| 38 | polyacrylamide | 4.0 | acetic | sodium perborate | diacetone(D) alcohol | 18 | 100 |
| 39 | polyacrylamide | 4.0 | acetic | sodium perborate | propargyl(D) alcohol | 18 | 75 |
| 40 | polyacrylamide | 4.0 | acetic | sodium perborate | ethylene(D) glycol | 18 | 100 |
| 41 | polyacrylamide | 5.0 | acetic | sodium perborate | monoethyl(D) amine | 18 | 100 |

TABLE I FOOTNOTES
*Trace amounts of polymer remained and it was visually determined that about 98 percent of the polymer was dissolved.
**Flocculation was observed.
*** Precipitate formed.
****Precipitate formed when oxidizing agent and acid were mixed together.
(A)present in the range of about 1.0 percent by weight of aqueous composition.
(B)present in the range of about 2.5 percent by weight of aqueous composition.
(C)present in the range of about 0.2 percent by weight of aqueous composition.
(D)present in the range of about 0.1 percent by weight of aqueous composition.

The results of the tests show that the aqueous compositions of the present invention were very effective in solubilizing the polymeric material.

the invention except as may be necessarily limited to the amended claims of reasonable equivalents thereof.

What is claimed is:

1. A method of solubilizing polymeric material which has been deposited in a porous media comprising:
   contacting the material with an aqueous composition having a pH of from about 2 to about 10 and comprising:
   (a) a water soluble carboxylic acid selected from the group consisting of formic acid, acetic acid, propionic acid, butyric acid, lactic acid, glycolic acid, citric acid and mixtures thereof; and,
   (b) an oxidizing agent selected from the group consisting of sodium perborate, hydrogen peroxide, an alkali metal peroxide, sodium carbonate peroxydihydrate, sodium peroxydiphosphate, potassium peroxydiphosphate, potassium carbonate peroxydihydrate, and mixtures thereof;
   (c) a source effective in promoting the decomposition of the oxidizing agent and selected from the group consisting of ethyl alcohol, methyl alcohol, propyl alcohol, n-butyl alcohol, isopropyl alcohol, isoamyl alcohol, ethylene glycol, diacetone alcohol, cuprous ions, ferrous ions, cobalt ions, and mixtures thereof.

2. The method recited in claim 1 wherein said carboxylic acid is selected from the group consisting of citric acid, acetic acid, and mixtures thereof and said oxidizing agent is sodium perborate.

3. The method recited in claim 2 wherein said acid is present in the range of from about 2.0 to about 20.0 percent by weight of the composition and said oxidizing agent is present in the range of from about 2.0 to about 20.0 percent by weight of the composition.

4. The method recited in claim 2 wherein the pH of said composition is about 4.

5. The method recited in claim 2 wherein said porous media is a subterranean formation and said polymeric material is selected from the group consisting of polyacrylamide, polyacrylic acid, polysaccharide, and mixtures thereof.

6. A method for increasing the permeability of a porous media which has its permeability decreased by the deposition of polymeric materials comprising:
   contacting the media with an aqueous composition having a pH of from about 2 to about 10 and comprising:
   (a) a water soluble carboxylic acid selected from the group consisting of formic acid, acetic acid, propionic acid, butyric acid, lactic acid, glycolic acid, citric acid and mixtures thereof; and,
   (b) an oxidizing agent selected from the group consisting of sodium perborate, hydrogen peroxide, an alkali metal peroxide, sodium carbonate peroxydihydrate, sodium peroxydiphosphate, potassium peroxydiphosphate, potassium carbonate peroxydihydrate, and mixtures thereof; and
   (c) a source effective in promoting the decomposition of the oxidizing agent and selected from the group consisting of ethyl alcohol, methyl alcohol, propyl alcohol, n-butyl alcohol, isopropyl alcohol, isoamyl alcohol, ethylene glycol, diacetone alcohol, cuprous ions, ferrous ions, cobalt ions, and mixtures thereof.

7. The method recited in claim 6 wherein said carboxylic acid is selected from the group consisting of citric acid, acetic acid, and mixtures thereof and said oxidizing agent is sodium perborate.

8. The method recited in claim 7 wherein said acid is present in the range of from about 2.0 to about 20.0 percent by weight of the composition and said oxidizing agent is present in the range of from about 2.0 to about 20.0 percent by weight of the composition.

9. The method recited in claim 8 wherein the pH of said composition is about 4.

10. The method recited in claim 9 wherein said polymeric material is selected from the group consisting of polyacrylamide, polyacrylic acid, polysaccharide, and mixtures thereof and said porous media is a subterranean formation.

* * * * *